(12) United States Patent
Winter

(10) Patent No.: US 7,729,241 B2
(45) Date of Patent: Jun. 1, 2010

(54) SYSTEM AND METHOD OF LIMITING COMMUNICATION RATES WITHIN PACKET-BASED COMMUNICATION NETWORKS

(75) Inventor: Robert Lee Winter, Leander, TX (US)

(73) Assignee: Dell Products, LP, Round Rock, TX (US)

(*) Notice: Subject to any disclaimer, the term of this patent is extended or adjusted under 35 U.S.C. 154(b) by 363 days.

(21) Appl. No.: 11/828,468

(22) Filed: Jul. 26, 2007

(65) Prior Publication Data

US 2009/0028050 A1 Jan. 29, 2009

(51) Int. Cl.
G01R 31/08 (2006.01)
(52) U.S. Cl. ...................................... 370/229
(58) Field of Classification Search ................. 370/230, 370/229
See application file for complete search history.

(56) References Cited

U.S. PATENT DOCUMENTS

| 4,646,287 | A | * | 2/1987 | Larson et al. | 370/400 |
| 6,097,697 | A | * | 8/2000 | Yao et al. | 370/230 |
| 6,427,166 | B1 | * | 7/2002 | Hurst et al. | 709/220 |
| 2002/0101836 | A1 | * | 8/2002 | Dorenbosch | 370/329 |
| 2003/0208618 | A1 | * | 11/2003 | Mor et al. | 709/238 |
| 2004/0001489 | A1 | * | 1/2004 | Moore et al. | 370/395.1 |
| 2006/0277450 | A1 | * | 12/2006 | Zaki et al. | 714/708 |

* cited by examiner

Primary Examiner—Derrick W Ferris
Assistant Examiner—Mang Yeung
(74) Attorney, Agent, or Firm—Larson Newman & Able, LLP

(57) ABSTRACT

A system and method of limiting communication rates within packet-based communication networks are disclosed. In one form, a method of altering communication rates within a communication network can include monitoring a data rate of a first communication link within a network, and detecting a congestion of a first end point coupled to the first communication link. The method can also include identifying the first end point, and determining a desired data rate of the first communication link to effect the congestion. The method can further include communicating at least one null packet to the first end point to alter the data rate of the first communication link at the first end point.

15 Claims, 4 Drawing Sheets

SYSTEM AND METHOD OF LIMITING COMMUNICATION RATES WITHIN PACKET-BASED COMMUNICATION NETWORKS

FIELD OF THE DISCLOSURE

This disclosure relates generally to information handling systems, and more particularly to a system and method of limiting communication rates within packet-based communication networks.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
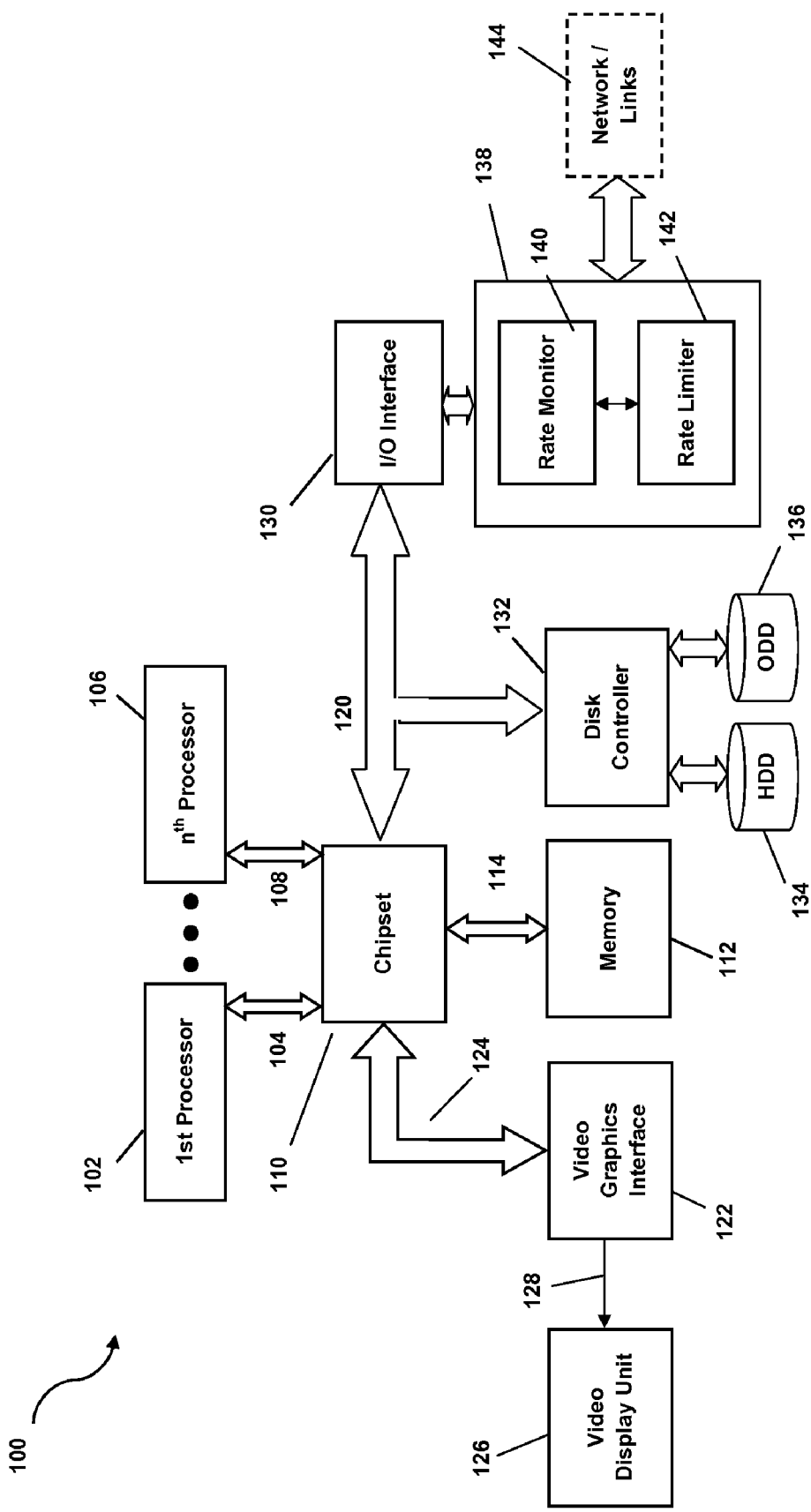
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a wireless communication device, a thin client, a diskless computer system or personal computer (PC) a network server or storage device, a switch router, wireless router, or other network communication device, or any other suitable device and can vary in size, shape, performance, functionality, and price. The information handling system can include memory, one or more processing resources such as one or more single or multiple-core central processing units (CPUs) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, a method of altering communication rates within a communication network is disclosed. The method can include monitoring a data rate of a first communication link within a network, and detecting a congestion of a first end point coupled to the first communication link. The method can also include identifying the first end point, and determining a desired data rate of the first communication link to effect the congestion. The method can further include communicating at least one null packet to the first end point to alter the data rate of the first communication link at the first end point.

According to another aspect of the disclosure, a communication module is disclosed. The communication module can include a data rate monitor operable to communicate data packets at a first data rate to a first end point operable to receive the data packets at a second data rate. The data rate monitor can be further operable to detect a congestion at the first end point in response to communicating a number of the data packets at the first data rate to the first end point. The communication module can also include a data rate limiter coupled to the data rate monitor and operable to generate a number of null packets to communicate to the first end point in response to the congestion.

According to a further aspect of the disclosure, an information handing system is disclosed. The information handling system can include a first source operable to communicate data packets at a first data rate. The information handling system can also include a first end point operable to receive the data packets from the first source at a second data rate. According to one aspect, the second data rate can be less than the first data rate. The information handling system can also include a rate limiter accessible by the first source and operable to generate a number of null packets in response to a congestion at the first end point. In one form, the congestion can result from the first source communicating a number of data packets at the first data rate to the first end point.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as n$^{th}$ physical processor 106 coupled to a second host bus 108. The first physical processor 102 can be coupled to a chipset 110 via the first host bus 104. Further, the n$^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the n$^{th}$ physical processor 106. For example, the chipset 110 including a chipset that can include a memory controller hub and an input/output (I/O) controller hub. As a memory controller hub, the chipset 110 can function to access the first physical processor 102 using first bus 104 and the n$^{th}$ physical processor 106 using the second host bus 108. The chipset 110 can also be used as a memory interface for accessing memory 112 using a memory bus 114. In a particular embodiment, the buses 104, 108, and 114 can be individual buses or part of the same bus. The chipset 110 can also include bus control and can handle transfers between the buses 104, 108, and 114.

According to another aspect, the chipset 110 can include an application specific chipset that connects to various buses, and integrates other system functions. For example, the chipset 110 can include using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can be used as at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to content to display within a video display unit 126. Other graphics interfaces may also be used. The video graphics interface 122 can output a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting to and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit (I$^2$C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the n$^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal, external, or remote disk drives such illustrated generally as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive. In one form, the HDD 134 can be remotely located and access via a network.

In one form, the information handling system 100 can include a communication module 138 coupled to the I/O interface 130 and employing a rate monitor 140 and a rate limiter 138. The communication module 138 can be integrated as a part of the I/O interface 130 and in other forms can be provided as a separate module housed internal or external to the information handling system 100. The communication module 138 can be coupled to a network 144 using one or more communication links operable to be coupled to one or more end points operable to receive and transmit data packets. According to one aspect, the network 144 can include an Ethernet/IP (Ethernet/Industrial Protocol) enabled network communication standard capable of handling large amounts of data at speeds of 10 Mbps or 100 Mbps, and at up to 1500 bytes per packet. In one form, the network can employ an open protocol at an application layer. According to one aspect, the network 144 employing Ethernet/IP can be configured as an active star network topology although other topologies can also be used. The network 144 employing a star topology can enable various configurations of devices coupled to end points and in some form, can include variable data rate devices (e.g. 10 Mbps and 100 Mbps devices). The network 144 can also be configured in other types of network configurations operable to employ any frame based or packet based communication protocols including, but not limited to Fibre Channel, fire wire, Infiniband, Asynchronous Transfer Mode (ATM), Small Computer System Interface over Internet Protocol (iSCSI), Fibre Channel over Ethernet (FCoE), Serial Attached SCSI (SAS), or any combination thereof.

During operation, the communication module 138 can be coupled to the network 144 using one or more network links (not expressly shown) to send and receive data packets to and from one or more destinations or end points. The communication module 138 can be employed to communicate data packets at a first data rate, such as 100 Mbps, and in one form, an end point within the network can be operable to communicate at a lesser data rate, such as 10 Mbps. The rate monitor 140 can monitor data packets being communicated to and from the information handling system 100 to the end point and can detect if a network congestion exists the end points. For example, the end point communication module 138 can communicate data at a higher rate than can be received by the end point. As such, a congestion can occur at the end point. In one form, the end point can communicate a message including a data field or flag having a value to indicate that a congestion has occurred. As such, the rate limiter 142 can initiate limiting the data rate by generating and inserting one or more "null" packets into a valid data stream including the data packets to deterministically reduce the delivered rate. For example, the null packet can include a minimum sized (64 byte) Ethernet packet having all zeros in the destination machine address code (MAC) address field. The source MAC address is the address associated with the information handling system 100 or the communication module 138. In this manner, as null packets are inserted into the data stream, a reduced data rate can be accomplished and the congestion at the end point can be altered. Additionally, having all zeros in the destination MAC address field results in a null destination MAC address that will be transparent to all switching devices since an address of zero is not a valid bridging table lookup address. As such, upon recognition of this null packet, the receiving station will discard and the null packet will not interfere with a valid data transfer or network traffic. Additionally, the null packet will not be forwarded beyond a point-to-point communication link or source-to-end point or destination communication link. However, the null packet can delay delivery of valid Ethernet frames thus effectively altering a data rate of a communication link within a network.

Figure 2:
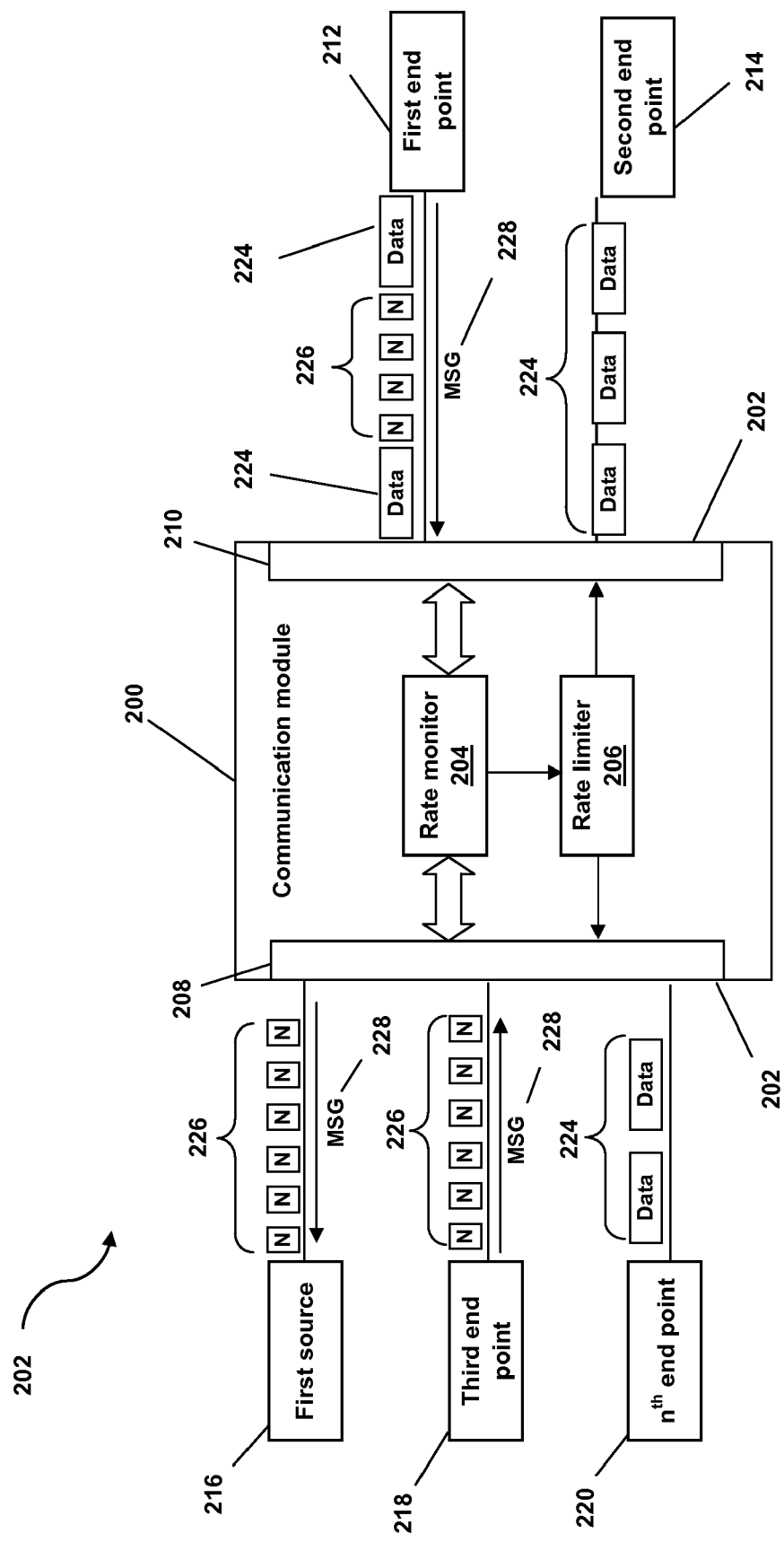
FIG. 2 illustrates a functional block diagram of a communication module within a network according to one aspect of the disclosure.

FIG. 2 illustrates a functional block diagram of a communication module, illustrated generally at 200, within a network 202 according to one aspect of the disclosure. The communication module 200 can include a switch, such as an Ethernet switch, hub, router, or various other Ethernet/IP modules. The communication module 200 can be employed by the information handling system 100 illustrated in FIG. 1 or in other forms can be used in association or combined with personal computers, mainframe computers, robots, input/output (I/O) devices, adapters, interfaces, programmable logic controllers (PLCs), and any other device, system, module, or any combination thereof that can employ the communication module 200. For example, communication module 200 can include a mezzanine card attached to a motherboard of a blade server within a chassis based system (not shown). In another form, the communication module 200 can include a gateway module that can be attached to an Ethernet switch operable to convert data from one protocol (e.g. Ethernet) to another protocol (e.g. Fibre Channel).

As packet-based network, the network 400 can communicate packets of information between a source and an end point or destination. For example, a packet can include a unit of data that can be routed between a source and a destination or end point on a network such as the Internet or any other packet-switched network. In one form, when a file such as an e-mail message, HTML file, Graphics Interchange Format file, Uniform Resource Locator request, etc., is sent from one a source to a destination or end point, over a network such as the Internet, the Transmission Control Protocol (TCP) layer of TCP/IP divides can divide a file into "packets" having an efficient size to communicate and route. Each of these packets can be separately numbered and can include the Internet address of the end point or destination. When all of the data packets of a file arrive at the end point or destination, the data packets can be reassembled into the original file by the TCP layer at the end point.

The communication module 200 can communicate using a packet-based scheme and can include a rate monitor 204, a rate limiter 206, a first communication interface 208 and a second communication interface 210. The rate monitor 204, the rate limiter 206, the first communication interface 208, and the second communication interface 210, may be configured in various combinations as desired. Additionally, each communication interface 208 and 201 can communicate with one or more data sources, end points, destinations, or any combination thereof. For example, the second communication interface 210 can be coupled to a first end point 212 and a second end point 214. The first communication module 208 can be coupled to a first source 216, a third end point 218, and an $n^{th}$ end point 220. Each source and end point can be coupled using various communication mediums operable to employ a packet based communication protocol. In one form, each source and end point can include an independent communication link, such as an Ethernet communication link, operable to communicate data packets 224. The communication module 200 can be further operable to send or receive null packets 226, such as a null packet 400 described in FIG. 4 below, to alter a congestion that may occur at an end point or destination. For example, the first end point 212 can be configured to communicate a maximum data rate (e.g. 10 Mbps).

According to one aspect, the communication module 200 can also be configured to communicate with the first end point 212 at a data rate that may be higher that the maximum data rate (e.g. 50 Mbps). As such, the first end point 212 can experience congestion due to receiving too many data packets from the communication module 200 over a given period. Upon a congestion occurring, the first end point 212 can communicate a message 228 indicating that a congestion has occurred, and the rate limiter can generate one or more null packets to insert into the data stream to enable the first end point 212 to process the data packets 224, while ignoring the null packets 226. In this manner, congestion within the network 202 can be reduced and efficient processing and use of bandwidth, including deterministic data rates within the network, can be employed.

According to another aspect, the communication module 200 can modify a data rate based on a request of an end point. For example, the first end point 212 can be operated at a first data rate of 10 Mbps. However, the first end point 212 can request to have the overall data rate altered from 10 Mbps to 5 Mbps by having the rate limiter 206 insert a specific number of null packets, along with the data packets. The communication module 200 can communicate the null packets and the data packets to the first end point 212. In one form, the first end point 212 can communicate the message 228 to the communication module 200 including a desired data rate at the first end point 212. The rate monitor 204 can request a number of data packets to insert into a data stream, and can output the null packets with the data packets to achieve a desired data rate at the first end point 212. In one form, as an amount of data packets to be communicated increases, the number of null packets can be increased to ensure a desired data rate can be maintained.

According to one aspect, the communication module 200 can be coupled to the first source 216 operable to communicate with the communication module 200. In one form, the first source 216 can communicate data at a higher rate than the communication module 200 may be able to receive data packets. For example, the first source 216 may be operable to communicate data packets at a rate of 100 Mbps and the communication module 200 may be operable to receive data packets at a maximum data rate of 50 Mbps. As such, if a congestion occurs at the communication module 202 operable as an end point between the first source 216 and the communication module 202, the communication module 200 can communicate the message 228 including a flag or other indicator within the message 228 to indicate a desired communication rate of the communication module 200. For example, the communication module 200 can communicate the message 228 including a desired data rate (e.g. 50 Mbps) to the first source 216. As such, the first source 216 can insert null packets 226 to reduce the effective data rate communicated by the first source 216 to the communication module 200. In this manner, the effective data rate at the communication module 202 operable as an end point can be modified as desired.

Figure 3:
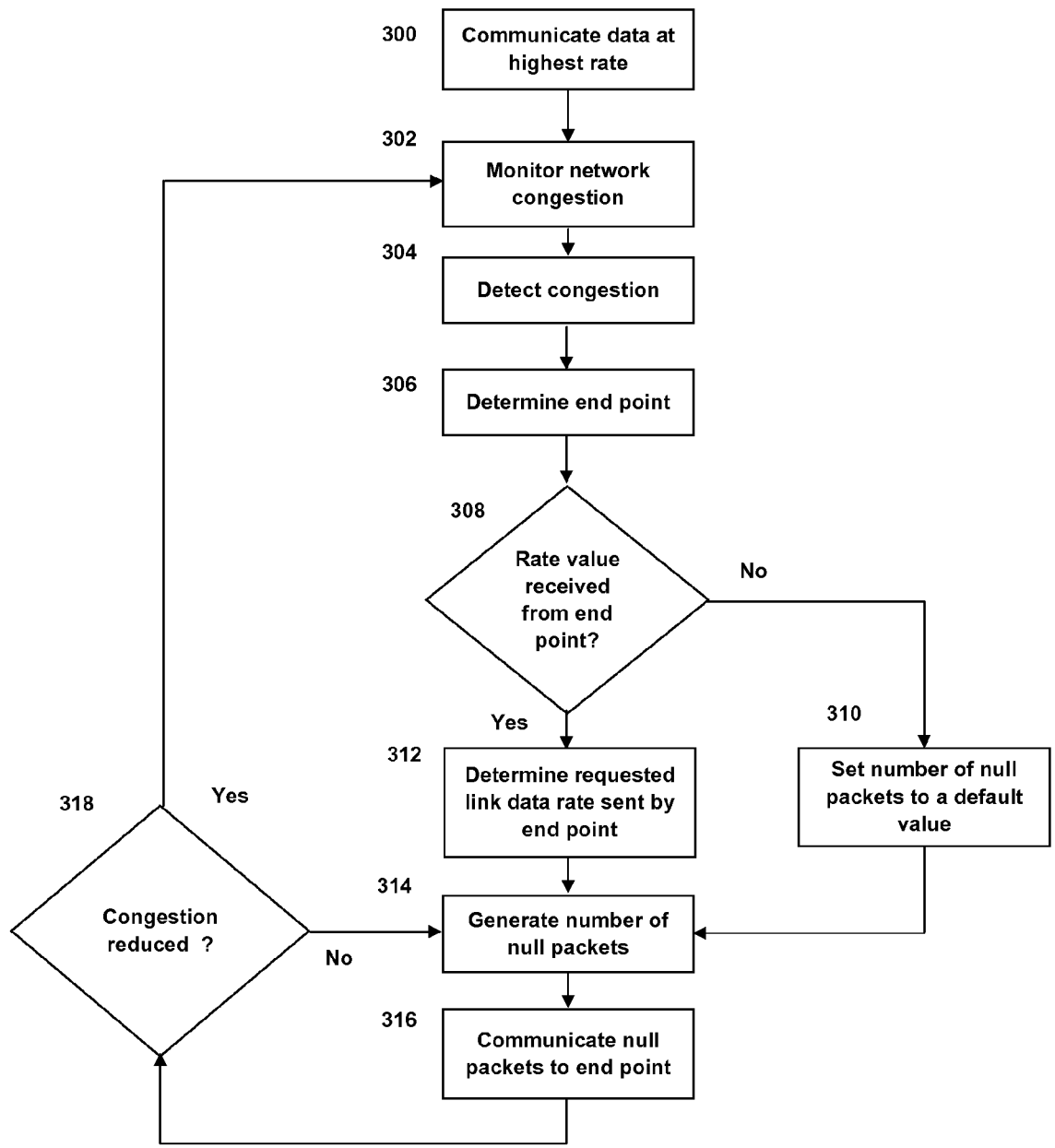
FIG. 3 illustrates a flow diagram of method of altering a data rate within a network according to one aspect of the disclosure.

FIG. 3 illustrates a flow diagram of method of altering a data rate within a network according to one aspect of the disclosure. FIG. 3 can be employed in whole, or in part, by the information handling system 100 depicted in FIG. 1, the network 200 described in FIG. 2 above, or any other type of system, controller, device, module, processor, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions, of the method of FIG. 3.

The method begins at block 300 as data or data packets are communicated within a network including an end point at the highest possible rate (e.g. 100 Mbps). For example, an data source can be coupled to an end point and communication can be sent at the highest rate to the end point. Upon communicating data at the highest possible rate, the method can the proceed to block 302, and the network or communication link between the source and the end point can be monitored to determine if congestion exists at the end point. If congestion is detected at block 304, the method can proceed to block 306 and the end point having the congestion can be determined. For example, a message can be communicated by and end point to a source indicating that a congestion has occurred. As such, the message can include an identifier identifying the end point and the end point can be identified at block 306. The method can then proceed to block 308 and the method can determine if a rate notice was received from the end point. For example, a rate value can include a value that can be used to identify a desired rate value (e.g. 10 Mbps, 20 Mbps, etc.) to communicate data to the end point. In one form, a look up table can be employed to determine a rate value based on one or more bit or word values communicated with the message.

If at block 312, a rate value may not be determined, the method can proceed to block 310 and a number of null packets can be established. For example, the method can use a default number of packets to gradually reduce the overall data rate until the congestion is reduced or minimized. In one form, the method can be modified to establish a counter including a current default value of null packets that can be gradually increased. As such, the default value can be stored within a memory of a source and modified and updated as desired to reduce a congestion at an end point. Upon setting the number of null packets at block 310, the method can proceed to block 314 as described below.

Figure 4:
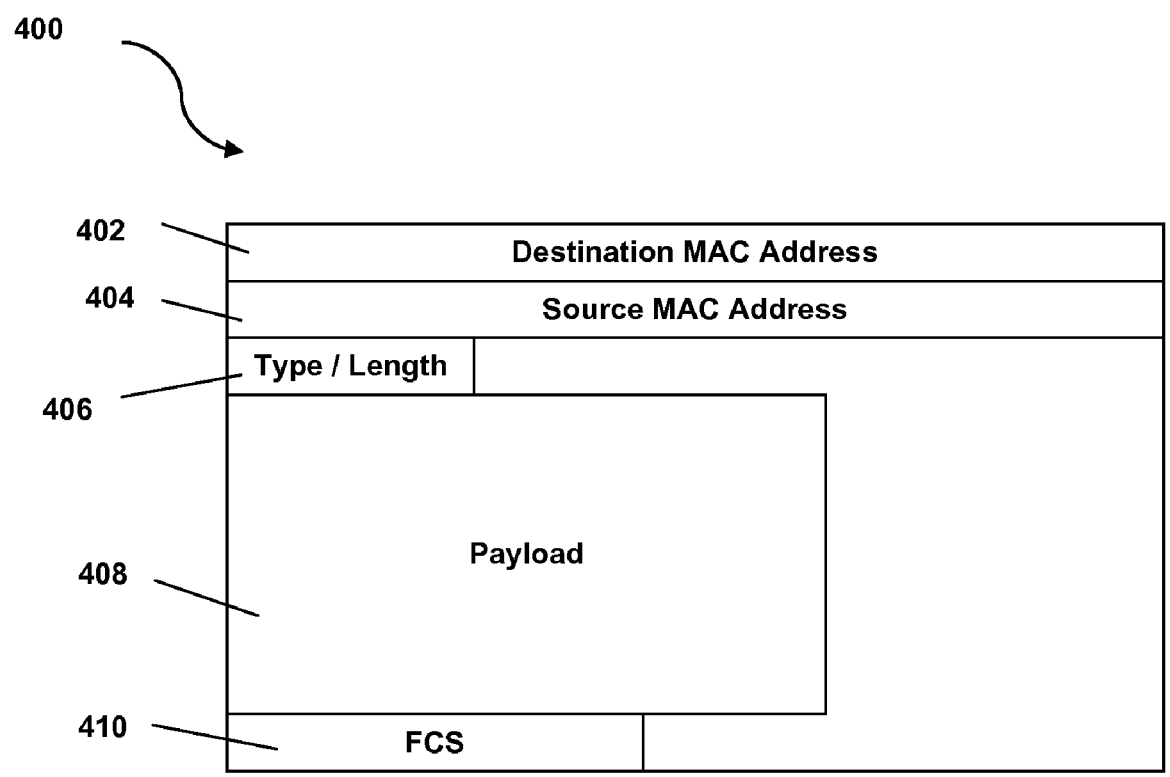
FIG. 4 illustrates a diagram of a null packet according to one aspect of the disclosure.

If at block 310, a rate value is received, the method can proceed to block 312 and a requested data rate of the end point can be determined. For example, a requested data rate value can be included within a message communicated by an end point. In other forms, a flag, bit, word, or any combination thereof, can be used to identify a requested data rate. Upon determining a data rate, the method can proceed to block 314 and a number of null packets to be communicated to the end point can be generated. FIG. 4 below describes one example of a null packet that can be generated. Upon generating a number of null packets, the method can proceed to block 316 and the one or more null packets can be inserted into the data stream being communicated to the end point. The method can then proceed to block 318 and if the network congestion has been reduced, the method can proceed to block 302 and repeat. If at block 318, the congestion at the end point has not been reduced, the method can proceed to block 314 and repeat. For example, if a desired data rate was not achieved, the method can proceed to block 314 and additional null packets can be generated as desired. If at decision block 318, a desired data rate is achieved, the method can proceed to block 304 and repeats.

In one form, the method of FIG. 3 can be modified to continuously insert null packets within the data stream to maintain a desired data rate as desired. For example, a data rate can be increased or decreased by inserting null packets within the network traffic communicated from a source to an end point. As such, if null packets are inserted into the network traffic, a data rate of the communication link between the source and the end point can be reduced. In this manner, a deterministic approach to managing network data rates can be achieved within networks having variable communication rates and capabilities.

FIG. 4 illustrates a diagram of a null packet, illustrated generally at 400, according to one aspect of the disclosure. The null data packet 400 can include a destination MAC address field 402, a source MAC address field 404, a type/length field 406, a payload 408, and a frame check sequence (FCS) field 410. In one form, a valid FCS value can include in 16-bit Hexadecimal value "0x1234", "0xABCD", "0xDEAD", "0xBEEF", etc. The null packet 400 can include various sizes and values. For example, in one embodiment the null packet 400 can include a minimum sized (64 byte) Ethernet packet with the destination MAC address field 402 having a size of six (6) bytes and a value of zero (e.g. "0x000000000000"). The source MAC address field 404 can be six (6) bytes and can include a valid source address. The type/length address field 406 can include a size of two (2) bytes and can include a null or zero values (e.g. "0x0000"). The payload field 408 can include a length of forty-six (46) bytes and a null value or all zeros. The FCS field 410 can include a size of four (4) bytes and a valid FCS value.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of altering communication rates within a communication network comprising:

monitoring, at a communications device, a data rate of a first communication link within a network;

detecting a first congestion of a first end point coupled to the first communication link; identifying the first end point;

determining a desired data rate of the first communication link to effect the congestion;

communicating at least one null packet to the first end point to alter the data rate of the first communication link at the first end point;

detecting a second congestion at a second end point within the network; detecting no congestion at a third end point within the network; generating a first plurality of null packets to communicate to the first end point; generating a second plurality of null packets to communicate to the second end point, the second plurality of null packets different than the first plurality of null packets; communicating the first plurality of null packets to the first end point; and communicating the second plurality of null packets to the second end point.

2. The method of claim 1, further comprising:
receiving a message from the first end point;
determining a requested data rate value within the message;
generating a number of null packets in response to determining the requested data rate value;
communicating the number of null packets to first end point.

3. The method of claim 1, further comprising:
receiving a message from the first end point;
determining a flag value within the message to indicate a status of the congestion; and
enabling communication of the at least one null packet in response to the flag value.

4. The method of claim 1, further comprising:
initializing the first end point to a maximum data rate;
altering the first end point to a lesser data rate, the lesser data rate being less than the maximum data rate.

5. The method of claim 4, further comprising:
decreasing the maximum data rate in response to a source communicating the at least one null packet;
determining a status of the congestion in response to communicating the at least one null packet.

6. The method of claim 5, further comprising:
detecting a decrease of the congestion at the first end point;
decreasing the communicating of the at least one null packet in response to detecting the decrease of the congestion at the first end point.

7. The method of claim 5, further comprising:
detecting a decrease of the congestion at the first end point;
maintaining the communicating of the at least one null packet in response to detecting the decrease of the congestion at the first end point.

8. The method of claim 1, further comprising:
determining a machine address code (MAC) address of the first end point;
inserting an invalid value within an address field of the at least one null packet; and
inserting a valid source value within a source address field of the at least one null packet.

9. The method of claim 1, further comprising inserting a plurality null values within a payload of the at least one null packet.

10. The method of claim 1, further comprising:
detecting the congestion at the first end point, the first end point located at a distance from a source;
generating a message to alter the data rate by receiving a plurality of null packets, wherein the message includes a preferred data rate value of the first end point; and
communicating the message to the source, wherein the source is operable to generate the plurality of null packets to satisfy the preferred data rate value.

11. A communication device comprising:
a data rate monitor coupled to a communication interface operable to:
communicate data packets at a first data rate to a first end point operable to receive the data packets at a second data rate;
detect a first congestion at the first end point in response to communicating a number of the data packets at the first data rate to the first end point; and detect a second congestion at a second end point; detect no congestion at a third end point; and
a data rate limiter coupled to the data rate monitor and operable to generate a first number of null packets to communicate to the first end point in response to the congestion; and to generate a second number of null packets to communicate to the second end point.

12. The communication device of claim 11, wherein the data rate monitor is further operable to:
initialize the first end point to a maximum data rate;
initiate an altering of a communication at the first end point to a lesser data rate, the lesser data rate being less than the maximum data rate.

13. The communication device of claim 11, wherein the data rate limiter is further operable to determine a number of null packets to generate in response to determining a requested data rate value of the first end point.

14. The communication device of claim 11, further comprising:
a communication interface operable to:
receive a message from the first end point;
communicate the number of null packets to first end point; and the data rate monitor further operable to:
determine a requested data rate value within the message; and initiate generation of the number of null packets in response to the requested data rate value.

15. The communication device of claim 11, wherein the null packets comprise:
a machine address code (MAC) address field including a first null value;
a source MAC address field including a valid source MAC value of a first source;
a type length field including a second null value;
a payload including a third null value; and
a frame check sequence (FCS) field including a valid FCS value.

* * * * *